(12) United States Patent
Ichinose et al.

(10) Patent No.: US 8,195,353 B2
(45) Date of Patent: Jun. 5, 2012

(54) GUIDE ROBOT DEVICE AND GUIDE SYSTEM

(75) Inventors: Ryoko Ichinose, Tsukuba (JP); Junichi Tamamoto, Kasumigaura (JP)

(73) Assignee: Hitachi, Ltd., Tokyo (JP)

( * ) Notice: Subject to any disclaimer, the term of this patent is extended or adjusted under 35 U.S.C. 154(b) by 1187 days.

(21) Appl. No.: 11/957,567

(22) Filed: Dec. 17, 2007

(65) Prior Publication Data

US 2008/0147261 A1    Jun. 19, 2008

(30) Foreign Application Priority Data

Dec. 18, 2006 (JP) ................................ 2006-339381

(51) Int. Cl.
*G01C 22/00* (2006.01)
(52) U.S. Cl. ............... 701/26; 701/23; 701/24; 701/25; 700/245; 700/248; 700/258; 700/259; 901/1
(58) Field of Classification Search .............. 701/23–28; 700/245, 248, 258, 259; 901/1
See application file for complete search history.

(56) References Cited

U.S. PATENT DOCUMENTS

| 7,243,024 | B2 * | 7/2007 | Endicott ...................... | 701/206 |
| 2005/0113974 | A1 * | 5/2005 | Doi ............................... | 700/245 |
| 2006/0184274 | A1 * | 8/2006 | Sakai et al. .................. | 700/245 |
| 2007/0150108 | A1 * | 6/2007 | Yokoyama et al. ........... | 700/245 |

FOREIGN PATENT DOCUMENTS

| JP | 07-239671 | 9/1995 |
| JP | 2003-280739 | 10/2003 |
| JP | 2003-340764 | 12/2003 |
| JP | 2005-066745 | 3/2005 |
| JP | 2005066745 A1 * | 3/2005 |
| JP | A-2005-103722 | 4/2005 |
| JP | A-2005-172879 | 6/2005 |
| JP | 2006-048666 | 2/2006 |
| JP | 2006-155039 | 6/2006 |
| JP | A-2006-198730 | 8/2006 |
| KR | 2004-26640 | 3/2004 |

OTHER PUBLICATIONS

G. Kim, W. Chung, K.R. Kim, M. Kim, S. Han and R. Shinn, "The Autonomous Tour-Guide Robot Jinny," In Proc. IEEE/RSJ International Conference on Intelligent Robots and Systems '04, 2004, pp. 3450-3455.*

(Continued)

*Primary Examiner* — Thomas Black
*Assistant Examiner* — Peter D Nolan
(74) *Attorney, Agent, or Firm* — Antonelli, Terry, Stout & Kraus, LLP.

(57) ABSTRACT

A guide robot device including a guide display unit for displaying the guide information to an unguided person and a moving unit adapted to move with the guide display unit mounted thereon is disclosed. The guide robot device further includes the guide display unit variable in the direction of the guide information, a destination position setting unit for setting the destination position of the unguided person, an unguided person position detection unit for detecting the position of the unguided person, and a guide position calculation unit for calculating the guide position as related to the destination position, the detected position of the unguided person and the distance from the guide robot device to the unguided person. The guide robot device is moved to the calculated guide position and the direction of the guide information determined.

4 Claims, 8 Drawing Sheets

OTHER PUBLICATIONS

R. Bischoff and V. Graeffe, "Hermes—A Versatile Personal Robotic Assistant," In Proc. of the IEEE, vol. 92, No. 11, Nov. 2004.*

N. Roy, G. Baltus, D. Fox, F. Gemperle, J. Goetz, T. Hirsh, D. Magaritis, M. Montemerlo, J. Pineau, J. Schulte, and S. Thrun. Towards Personal Service Robots for the Elderly. In Workshop on Interactive Robots and Entertainment (WIRE 2000), 2000.*

Japanese Office Action issued Sep. 29, 2009; Japanese Patent Application No. 2006-339381—Partial Translation of Office Action.

Korean Office Action issued Apr. 27, 2009; Korean Patent Application No. 2007-132506—Partial Translation of Office Action.

A. Farinelli et al., "Multirobot systems: a classification focused on coordination," IEEE transactions on systems, man, and cybernetics—Part B: Cybernetics vol. 34, No. 5, pp. 2015-2028, 2004.

* cited by examiner

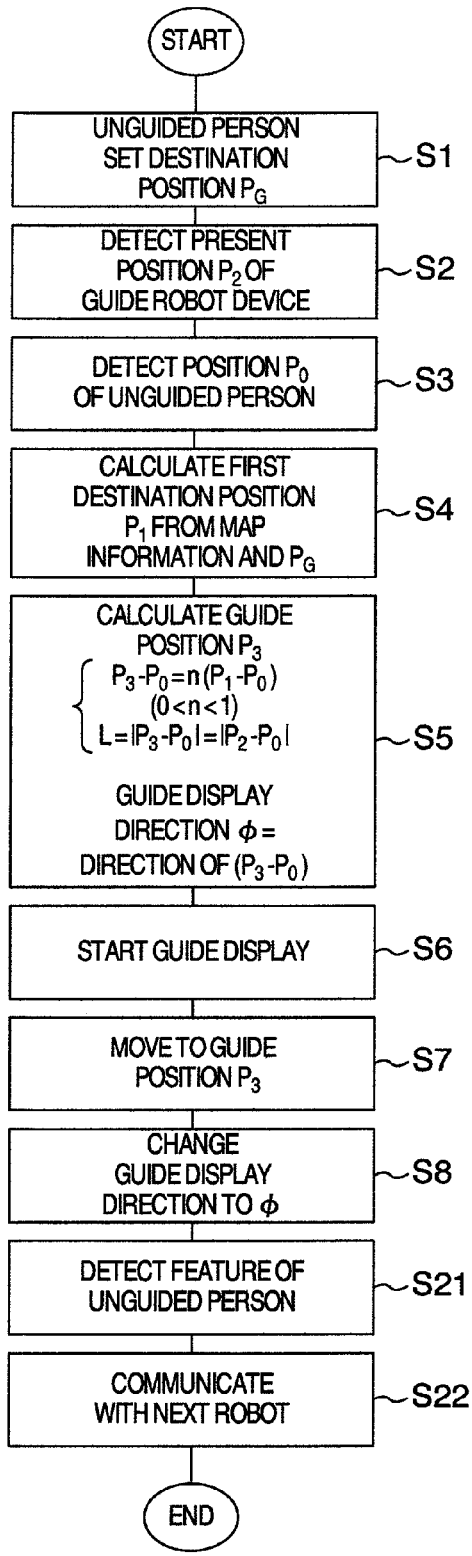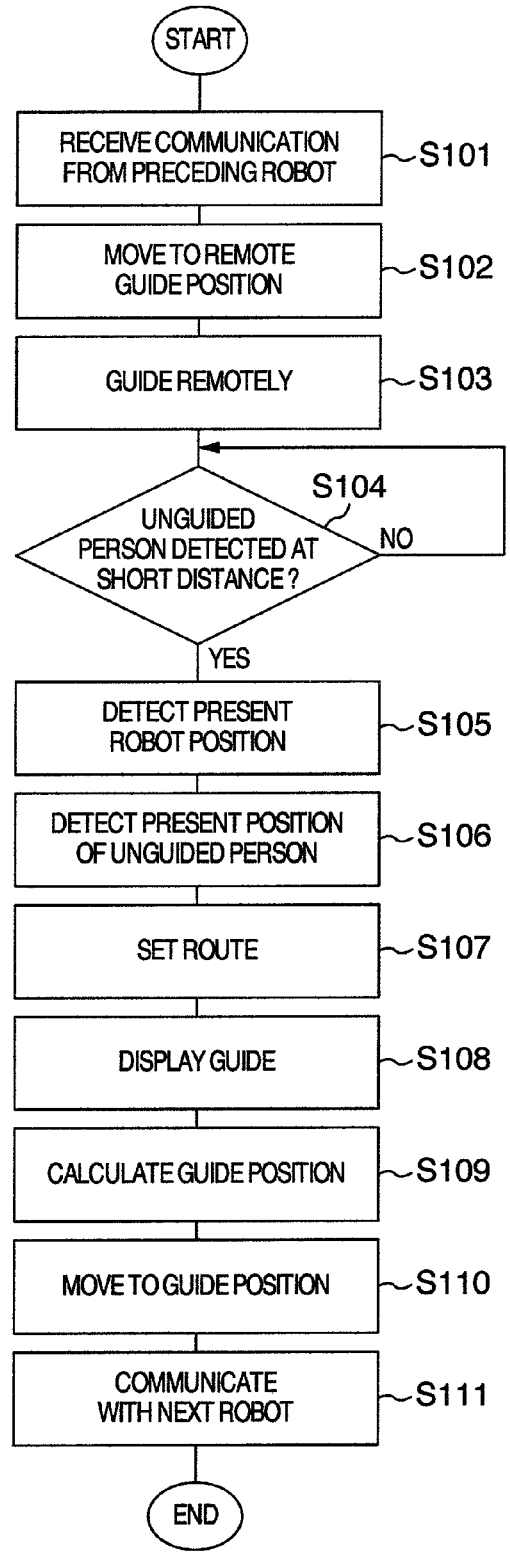

GUIDE ROBOT DEVICE AND GUIDE SYSTEM

BACKGROUND OF THE INVENTION

This invention relates to a robot device and a guide system for guiding an unguided person such as a visitor to a destination.

In recent years, many office robots and pet robots have been developed which, unlike the conventional industrial robots, are used in the activities of daily living. The assumed jobs of such robots are to guide an unguided person to the destination in an office or act as a companion for an old person. The office robot has been developed, for example, which asks a visitor where he/she wants to go and guides him/her by walking behind him/her to the destination.

Also, a robot has been developed, as described in JP-A-2006-48666, which traces a wandering person by moving ahead or behind him/her while observing his/her walking.

SUMMARY OF THE INVENTION

In JP-A-2006-48666, one robot can guide an unguided person to only one destination at a time inefficiently. A guide only by indicating the route on the map without accompanying the visitor could increase the number of persons guided for a predetermined time. In the case where the route is complicated, however, such a guide is difficult to understand and unkind.

To protect the security of the unguided person, on the other hand, the simple tracing is insufficient, and more detailed guide is necessary for the unguided person to walk along the edge of a road or go home to protect him/her from a traffic accident.

The object of this invention is to provide a guide robot device and a guide system including a plurality of guide robot devices, wherein a number of unguided persons can be guided efficiently to the destination in an easy-to-understand way with a small number of guide robot devices.

In order to achieve the object described above, according to one aspect of the invention, there is provided a guide robot device comprising a guide display unit for displaying the guide information to an unguided person and a moving unit moved with the guide display unit mounted thereon, wherein the direction of the guide information on the guide display unit is variable, the robot guide device further comprising a destination position setting unit for setting the destination position of the unguided person, an unguided person position detection unit for detecting the position of the unguided person and a guide position calculation unit for calculating the guide position as related to the destination position, the detected position of the unguided person and the distance from the guide robot device to the unguided person, wherein the guide robot device is moved to the calculated guide position and the direction of the guide information is determined.

According to another aspect of the invention, there is provided a guide system comprising a plurality of guide robot devices each including a guide display unit for displaying the guide information to an unguided person and a moving unit adapted to move with the guide display unit mounted thereon, wherein each guide robot device includes the guide display unit with the guide information variable in direction, a destination position setting unit for setting the destination position of the unguided person, an unguided person position detection unit for detecting the position of the unguided person, a guide position calculation unit for calculating the guide position as related to the destination position and the detected position of the unguided person, and a communication unit for establishing communication between the guide robot devices, and wherein the information on the destination position set by one guide robot device is transmitted to another guide robot device.

According to this invention, the guide position is calculated as related to the destination position, the position of the unguided person and the distance from the guide robot device to the unguided person thereby to determine the direction of the guide information. Therefore, the destination guide can be displayed at a position easily visible by the unguided person. Thus, a number of persons can be guided to their destinations with a small number of guide robot devices.

Other objects, features and advantages of the invention will become apparent from the following description of the embodiments of the invention taken in conjunction with the accompanying drawings.

BRIEF DESCRIPTION OF THE DRAWINGS

FIGS. 5A and 5B are flowcharts showing the guide operation according to the another embodiment.

DETAILED DESCRIPTION OF THE EMBODIMENTS

An embodiment is explained below with reference to the drawings.

Figure 1:
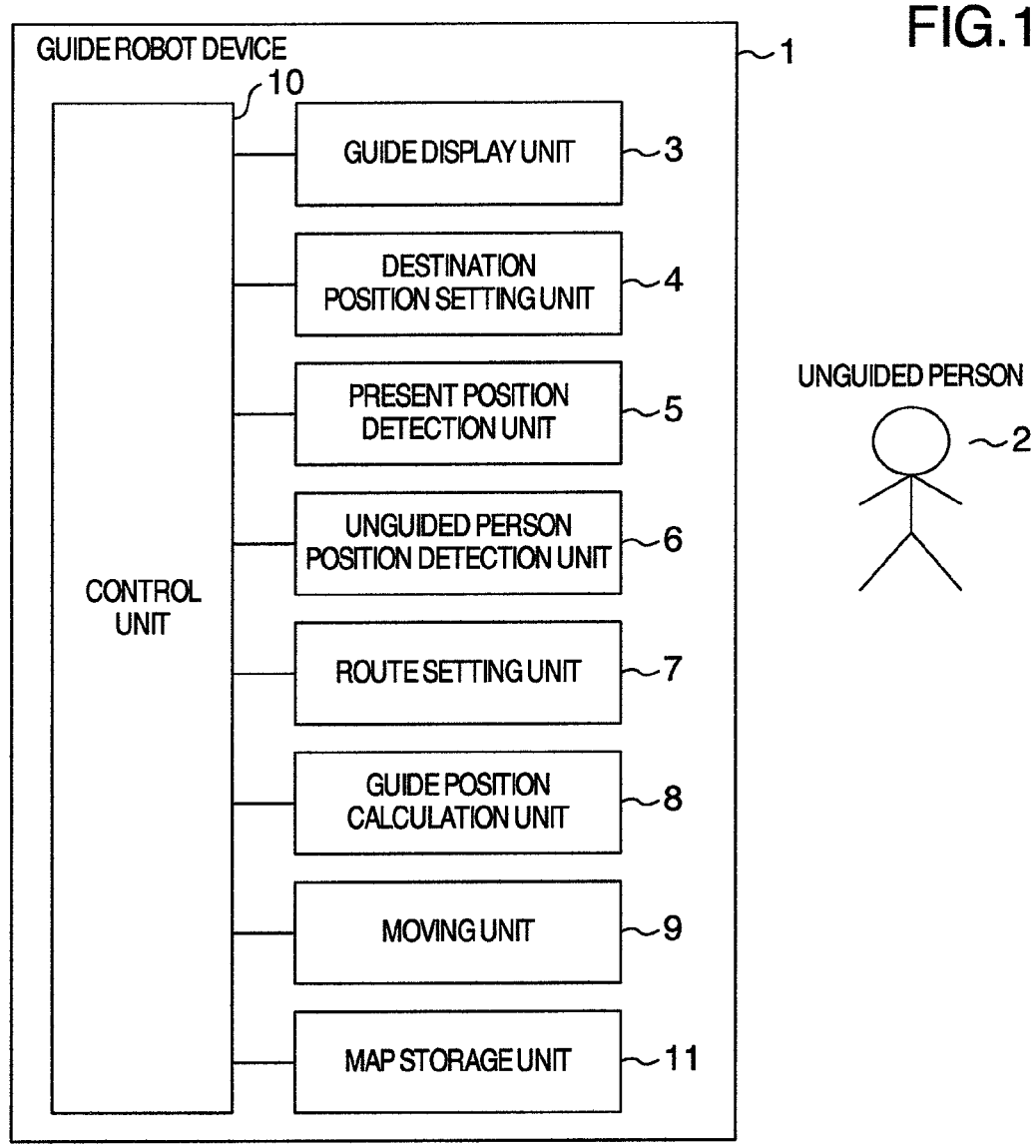
FIG. 1 is a block diagram showing the configuration of a guide robot device according to an embodiment of this invention.

FIG. 1 is a diagram showing an example of the configuration of a guide robot device. Reference numeral 1 designates a guide robot device, and numeral 2 an unguided person (that is, a person to be guided). Numeral 3 designates a guide display unit such as a liquid crystal display. Numeral 11 designates a map storage unit for storing the map information. Numeral 4 designates a destination position setting unit for setting the position of the destination of the unguided person 2. The guide display unit 3 is configured of, for example, a liquid crystal display and a touch panel, the map information of the map storage unit 11 is displayed on the guide display unit 3, and the unguided person 2 designates the position of the destination by touching the position of the destination on the map on the touch panel.

As an alternative, a voice recognition unit is arranged in the guide robot device 1, so that the destination designated aurally by the unguided person 2 and recognized by a voice recognition unit is searched for by the destination position setting unit 4 from the map information of the map storage unit 11 thereby to set the position of the destination.

Numeral 5 designates a present position detection unit for detecting at which position the guide robot device 1 is currently located on the map of the map storage unit 11 using, for example, the GPS or the position identification marker recognition information. With a given point in the guide robot device 1 as the origin, the position of the origin is set as the present position of the guide robot device 1. Numeral 6 designates an unguided person position detection unit for detecting the unguided person 2 using the proximity sensor or the laser range finder and thus detects the present position of the unguided person 2 relative to the position of the guide robot device 1.

From the output information of the present position detection unit 5 and the unguided person position detection unit 6, the present position of the unguided person 2 on the map of the map storage unit 11 is calculated. Numeral 7 designates a route setting unit for setting the route from the present position of the unguided person 2 to the position of the destination along roads or corridors on the map of the map storage unit 11. In the case where the route is curved, the corner of each curve is set as a destination and the route to the final destination is indicated by a polygonal line connecting line segments (straight lines).

Numeral 8 designates a guide position calculation unit for determining the guide position on the line segments connecting the present position and the destination of the unguided person 2. Numeral 9 designates a moving unit for moving the guide display unit 3 to the guide position calculated by the guide position calculation unit 8. In the case where the guide display unit 3 is arranged on the surface of a short guide robot device 1, the whole guide robot device 1 is moved by a moving mechanism including wheels and legs. A tall guide robot device 1, on the other hand, with the guide display unit 3 held in an arm, is moved to a position somewhat displaced from the guide position in order not to obstruct the field of vision of the unguided person 2 viewing in the direction of the destination, and only the guide display unit 3 is moved by the arm to the position where the field of vision of the unguided person 2 is not obstructed. As an alternative, a display with a transparent background is used as the guide display unit 3, which is moved by the arm to the guide position at a height where the unguided person 2 can view the map information overlapped on the real landscape. Numeral 10 designates a control unit for controlling the various units in the guide robot device 1.

Figure 2A:
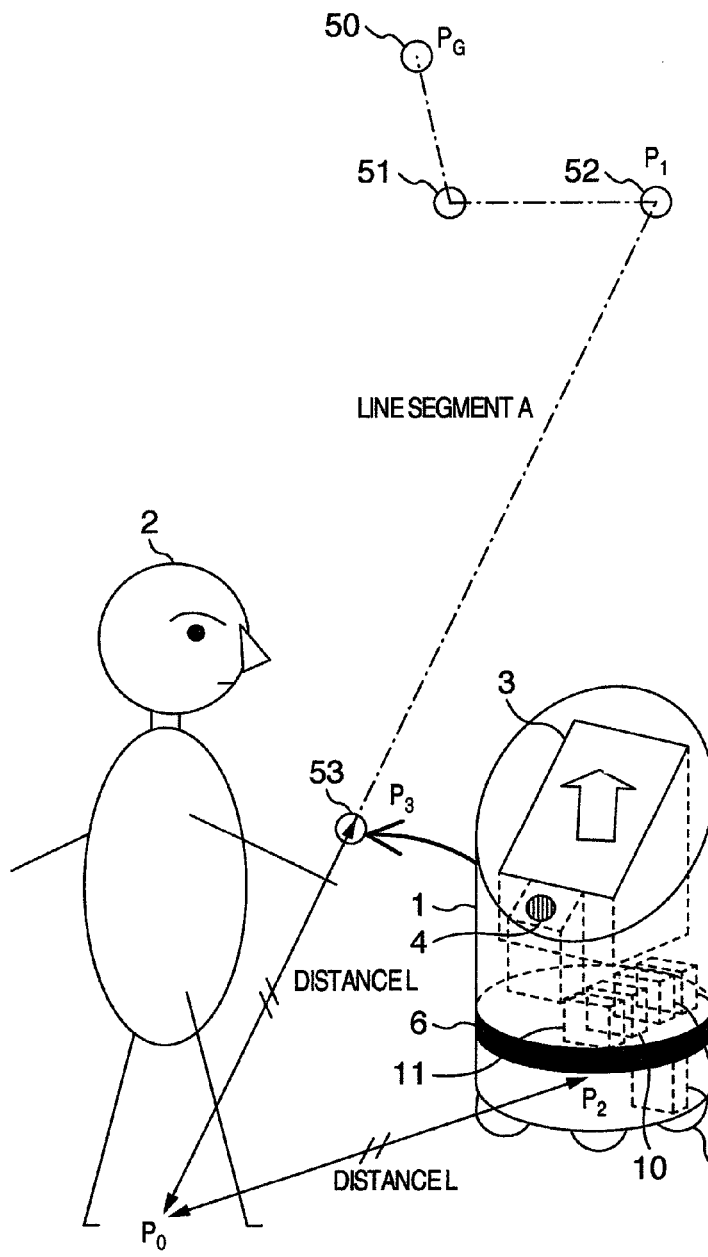
FIG. 2A is a diagram showing a guide system according to an embodiment of the invention.
Figure 2B:
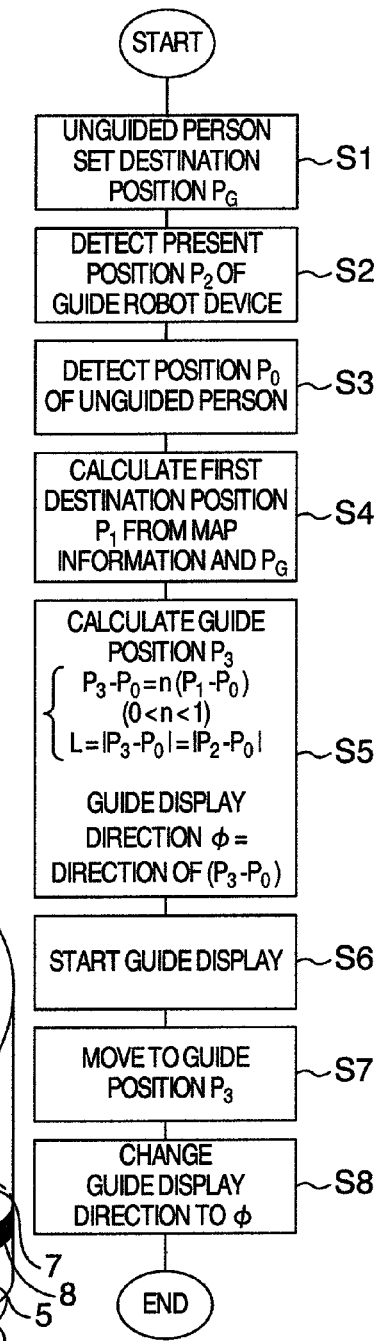
FIG. 2B is a flowchart for explaining the guide system according to the embodiment.

Next, a method of calculating the guide position by the guide position calculation unit 8 is explained with reference to FIG. 2A showing the particular method with reference to the flowchart shown in FIG. 2B.

The unguided person 2 sets the destination position PG 50 using the destination position setting unit 4 (S1). The present position detection unit 5 detects the present position P2 of the guide robot device 1 (S2). The unguided person position detection unit 6 detects the unguided person 2 and determines the present position P0 of the unguided person (S3). After that, the route setting unit 7 sets the route from the present position P0 of the unguided person 2 to the destination position PG on the map stored in the map storage unit 11 (S4).

Numerals 51, 52 designate the corners of curves on the set route. The nearest corner is assumed to be the first destination position P1 52. The guide position calculation unit 8 calculates one point on the line segment A connecting the present position P0 of the unguided person 2 and the first destination position P1 52 as a guide position P3 53 (S5). The guide position P3 53 is desirably located at a point on the line segment A where the distance L from the unguided person 2 is equal to the distance from the present position P0 of the unguided person 2 to the present position P2 of the guide robot device 1.

Also, the direction $\phi$ of guide display is set equal to the direction from the present position P0 of the unguided person 2 toward the guide position P3. Specifically, the vector from the origin in the guide robot device 1 to the guide display unit 3 is fixed and stored as the known information. The sum of the vector from the position of the unguided person 2 to the present position of the guide robot device 1 and the vector from the origin in the guide robot device 1 to the guide display unit 3 is set in the same direction as the vector from the position of the unguided person 2 as a starting point to the guide position as a terminal point. After that, the guide display unit 3 displays the guide in the direction of the destination (S6). The moving unit 9 moves the guide display unit 3 to the guide position P3 (S7). The guide display unit 3 changes the direction of guide display to $\phi$ in accordance with the movement of the guide display unit 3 (S8).

As the result of the above-mentioned operation, the unguided person 2 can be guided in the state where the direction of the destination and the arrow on the map displaying the guide display unit 3 coincide with the direction of the destination in the real landscape, and therefore, can easily grasp the direction of the destination or the direction in which to proceed.

Figure 3:
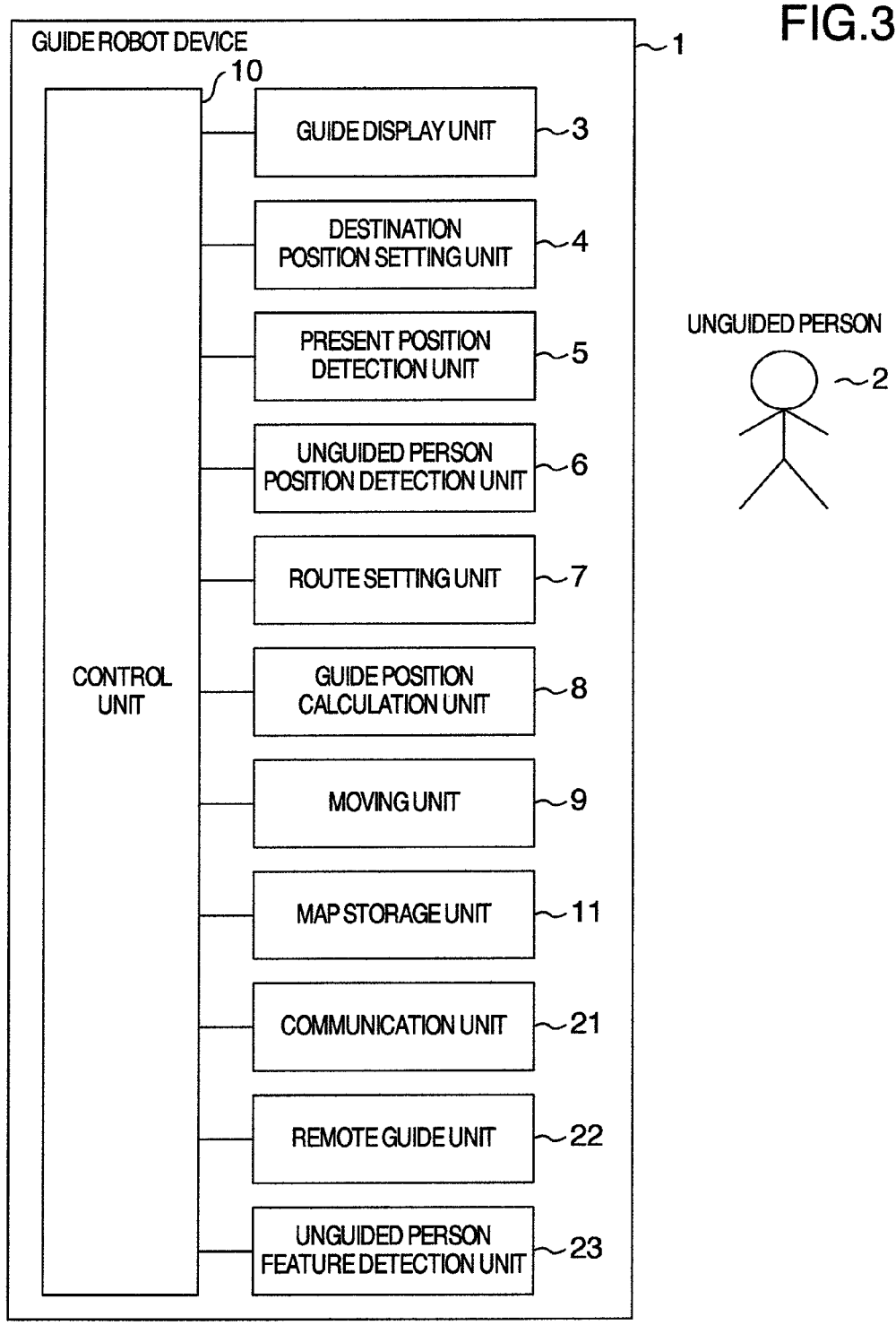
FIG. 3 is a block diagram showing the configuration of a guide robot device according to another embodiment of this invention.

Next, another embodiment is explained. FIG. 3 is a diagram showing a guide robot device 1 in which a communication unit 21 and a remote guide unit 22 are added to the configuration shown in FIG. 1. An unguided person feature detection unit 23 is configured of a camera and an image processing unit or a radio ID recognition unit for acquiring the feature information of the unguided person 2 from the face image and the ID information of the unguided person 2. The communication unit 21 transmits and receives the destination position, the unguided person position information and the unguided person feature information to and from another guide robot device. The remote guide unit 22 guides, i.e. notifies the unguided person 2 of the direction of the destination from a remote point by, for example, blinking the light or by driving and waving the robot arm toward the unguided person 2.

The moving unit 9, in addition to the function as the remote guide unit 22 shown in FIG. 1, has the function of moving the remote guide unit 22. The guide position calculation unit 8 calculates the remote guide position described later in addition to the guide position shown in FIG. 2.

Figure 4:
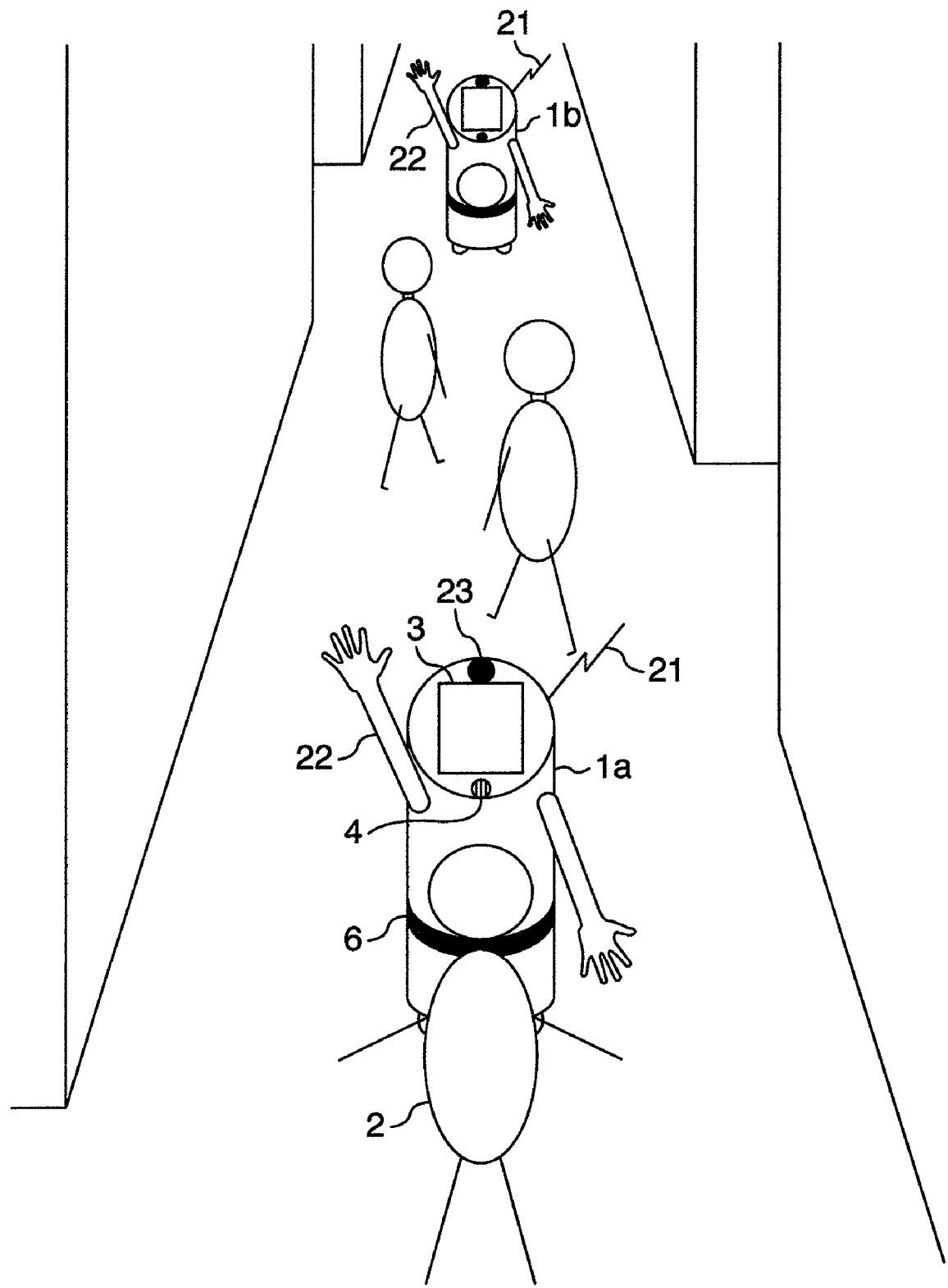
FIG. 4 is a diagram showing a guide system according to the another embodiment of the invention.

FIG. 4 shows the arrangement of the guide robot devices having the configuration shown in FIG. 3 for guiding the unguided person in relay. Numeral 1*a* designates a guide robot device in the process of guiding the unguided person 2. Numeral 1*b* designates a guide robot device staying in the neighborhood of the next destination. The guide robot device 1*a* transmits the destination position, the information on the present position of the unguided person and the unguided person feature information to the guide robot device 1*b*, which receives these information. Next, the guide robot device 1*b* determines a remote guide position in the neighborhood of the destination on the line segment connecting the present position of the unguided person and the destination. Then, the guide robot device 1*b* moves the remote guide unit 22 to the remote guide position. After that, the remote guide unit 22 remotely guides in the direction of the unguided person 2. In FIG. 4, the guide robot device 1*a* and the guide robot device 1*b* wave a hand to each other to permit the unguided person 2 to easily find the guide robot device 1*b*.

The unguided person 2 who has found the guide robot device 1b can reach the neighborhood of the destination by proceeding toward the guide robot device 1b. In the case where the guide robot device 1b cannot set the remote guide position visually recognizable by the unguided person 2 due to the existence of an elevator or the like midway of the route, the image synthesized on the map showing the manner in which the guide robot device 1b remotely guides at the remote guide position is alternatively displayed on the guide display unit 3 of the guide robot device 1a.

Also, in the example described above, the feature point detected by the guide robot device 1a is transmitted to the guide robot device 1b, which in turn detects the coincident feature point thereby to identify the unguided person 2 who has come to the neighborhood of the destination. As an alternative, the feature point is not detected by the guide robot device 1a, and the unguided person position detection unit 6 of the guide robot device 1b remotely detects a person existing at the received present position of the unguided person 2 thereby to identify the unguided person 2. After that, the unguided person position detection unit 6 traces the position of the unguided person 2 until the unguided person comes to the neighborhood of the destination thereby to recognize the arrival of the unguided person at the neighborhood of the destination.

Next, the flow of the relay-type guide operation is explained with reference to the flowchart of FIGS. 5A, 5B showing the flow of the relay-type guide operation.

First, in FIG. 5A, steps S1 to S8 are the same as the corresponding steps in the operation flow shown in FIG. 3. After step S8, the unguided person feature detection unit 23 detects the face image and the radio ID constituting the features of the unguided person S21. Then, the destination position, the information on the present position of the unguided person and the unguided person feature information are transmitted to the guide robot device staying in the neighborhood of the next destination (S22). Next, in FIG. 5B, the guide robot device which has received the destination position, the information on the present position of the unguided person and the unguided person feature information (S101) moves the remote guide unit 22 to the remote guide position (S102), and the remote guide unit 22 remotely guides the unguided person (S103). After that, the standby mode is entered until the unguided person having the feature coincident with the unguided person feature information received is detected by the unguided person feature detection unit 23 in the neighborhood of the destination (S104). During the standby mode, other jobs may be done. Once the unguided person having the features coincident with the unguided person feature information received reaches the neighborhood of the destination, the same operation as steps S2 to S8 is performed. Specifically, the present position detection unit 5 detects the present robot position (S105), the unguided person position detection unit 6 detects the present position of the unguided person 2 (S106), the route setting unit 7 sets the route from the present position of the unguided person 2 to the received destination position (S107), the display unit 3 displays the guide (S108), the guide position calculation unit 8 calculates the guide position (S110), and the moving unit 9 moves the guide display unit 3 to the guide position (S110).

After that, the received destination position, the received unguided person feature information and the present position of the unguided person 2 detected by the unguided person position detection unit 6 are transmitted to the guide robot device staying in the neighborhood of the next destination. The guide robot device that has received these information performs the operation of steps S101 to S111. In this way, the operation of steps S101 to S111 is performed in relay by the guide robot device staying in the neighborhood of each destination until the unguided person 2 reaches the final destination.

In the manner described above, the unguided person 2 can proceed while grasping the next destination, and therefore, can be guided to the final destination in an easy-to-understand way with a small number of guide robot devices.

Figure 6:
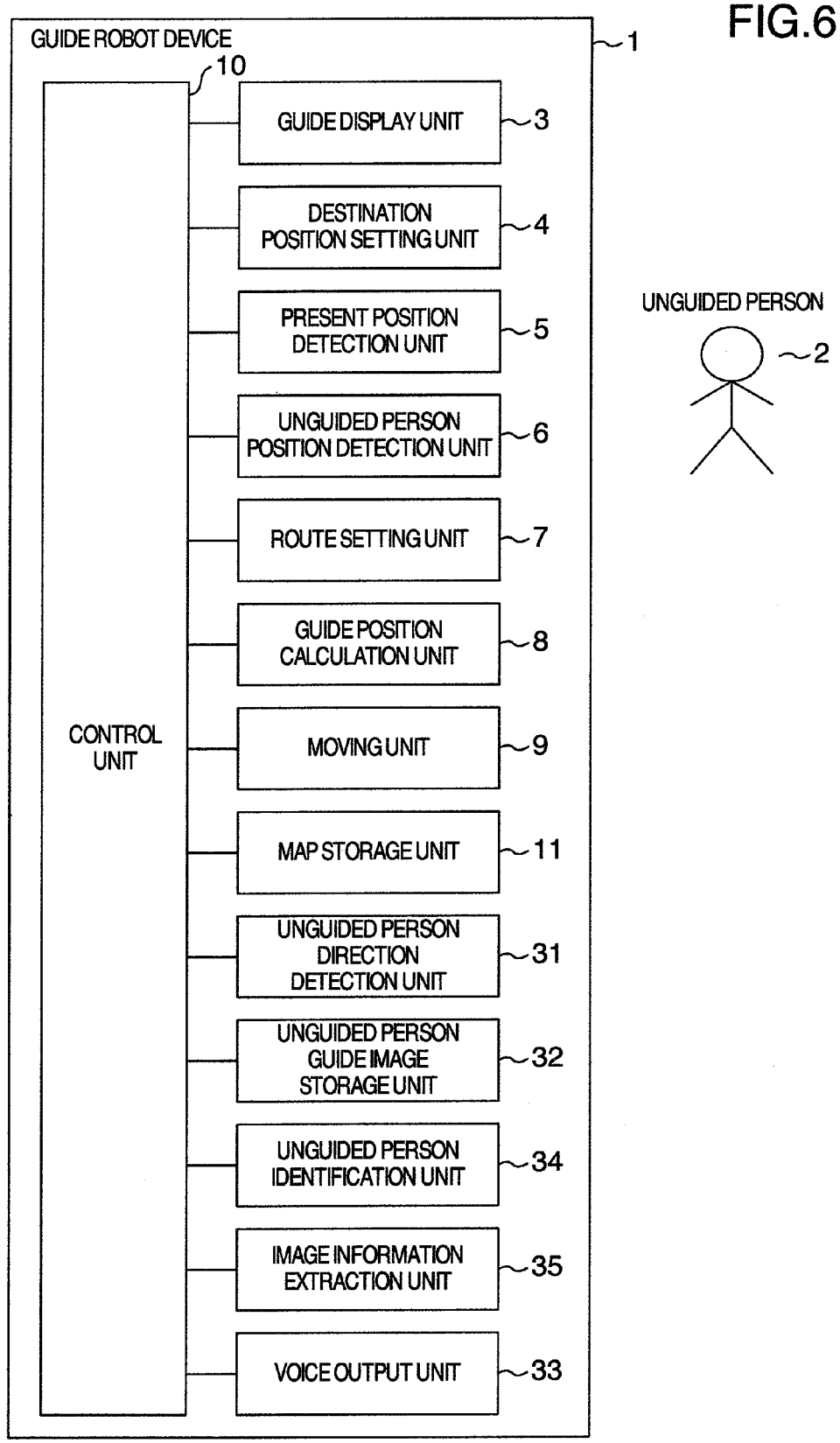
FIG. 6 is a block diagram showing a guide robot device according to still another embodiment of this invention.

Next, still another embodiment is described. FIG. 6 is a diagram sowing an example of still another configuration of the guide robot device. In this configuration, an unguided person direction detection unit 31, an unguided person guide image storage unit 32 and a voice output unit 33 are added to the configuration shown in FIG. 1. The unguided person direction detection unit 31 is a camera image recognition unit for detecting the direction of the face of the unguided person 2 by picking up his/her face image. The unguided person guide image storage unit 32 stores the image such as the face image of a family member interesting to the unguided person 2.

In the case where a plurality of unguided persons are guided by one guide robot, the aforementioned image is stored as related to the ID of the unguided person to be displayed in order to display a proper image to each unguided person. An unguided person identification unit 34 having a data base for storing the correspondence between the face image and the ID of the unguided person retrieves the face image most similar to the face image picked up by the camera image recognition unit, and stores the ID of the particular unguided person in a memory as the present unguided person ID. As an alternative, the unguided person identification unit 34 is a keyboard for inputting the unguided person ID, and the unguided person ID thus input is stored in a memory as the present unguided person ID. In an image information extraction unit 35, the image related to the present unguided person ID stored in the unguided person identification unit 34 is extracted from the unguided person ID guide image storage unit 32. The image thus extracted is displayed on the guide display unit 3.

A voice output unit 33 is a speaker high in directivity for outputting the voice with the aim of attracting the attention of the unguided person 2 to the direction in which the guide robot device exists.

Figure 7:
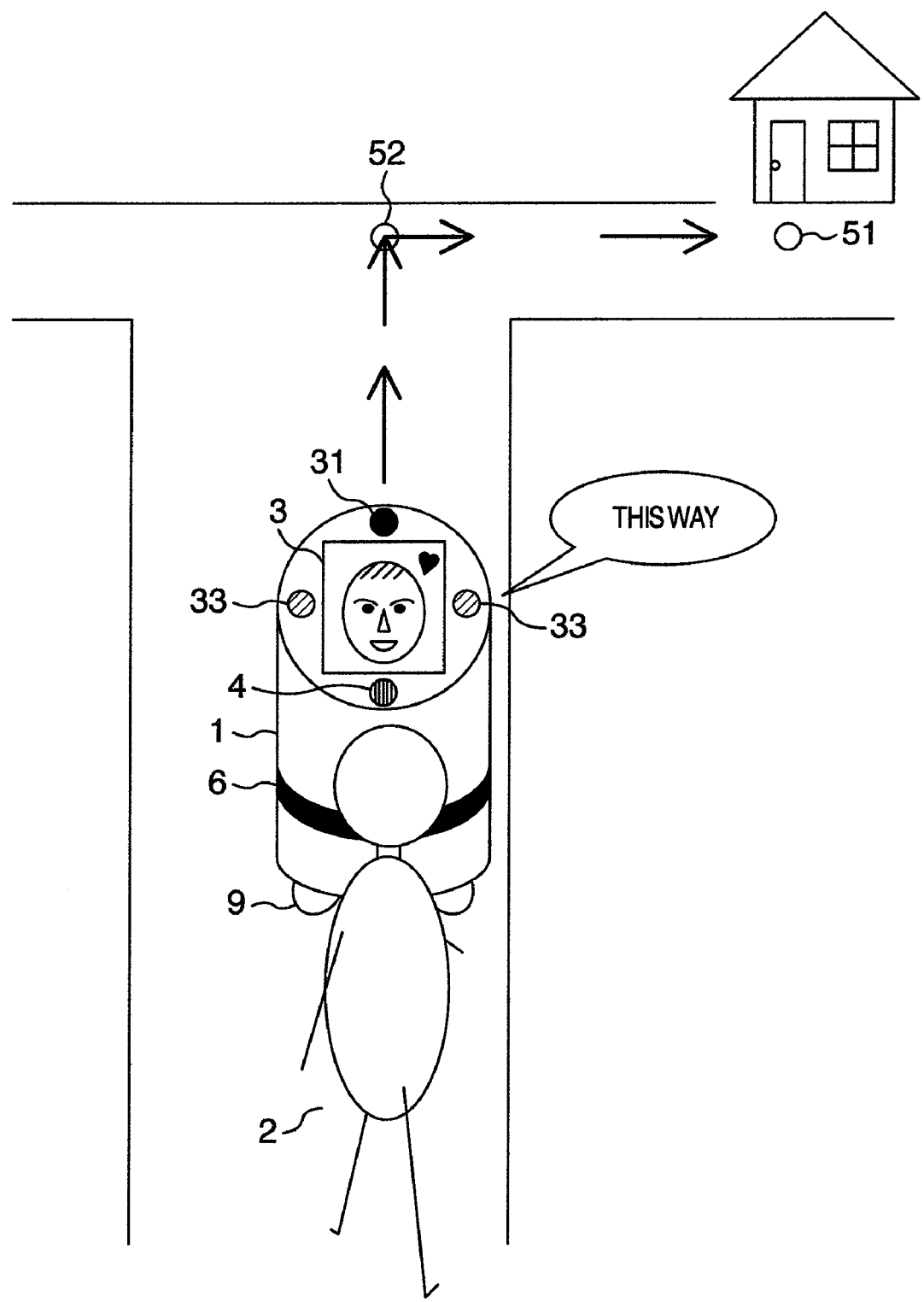
FIG. 7 is a diagram showing a guide system according to the still another embodiment of the invention.

FIG. 7 shows the method by which the guide robot device having the configuration shown in FIG. 6 performs the guide operation. The guide robot device performs the guide operation while moving slowly toward the destination on a straight line connecting the present position and the destination position. Specifically, the guide position calculation unit 8 moves the calculated guide position slowly toward the destination. Once the relative distance between the unguided person 2 detected by the unguided person position detection unit 6 and the guide robot device becomes longer than a preset upper-limit distance, the rate of movement is reduced, and vice versa.

Also, the image stored in the unguided person guide image storage unit 32 is displayed on the guide display unit 3 to attract the attention of the unguided person 2, who thus approaches the guide display unit 3. In the case where the direction in which the unguided person 2 walks changes and the guide robot device is displaced from the guide position, the guide display unit 3 is moved in the direction of the unguided person detected by the unguided person direction detection unit 31. In the process, the voice may be output from the voice output unit 33 to notify the unguided person 2 of the direction in which the guide robot device exists. After that, the guide display unit 3, having entered the field of vision of the unguided person 2, is moved slowly toward the guide position.

Instead of displaying the image stored in the unguided person guide image storage unit 32 on the guide display unit 3, the guide robot device 1 may have the function as a portable telephone, so that the image and the voice sent by the family of the unguided person using the portable telephone with the camera may be output to the guide display unit 3 and the voice output unit 33. Also, in order to guide a plurality of unguided persons 2 with one guide robot device, the image of the unguided persons 2 identified by the unguided person feature detection unit 23 shown in FIG. 3 may be extracted from the unguided person guide image storage unit 32 and displayed on the guide display unit 3.

Figure 8:
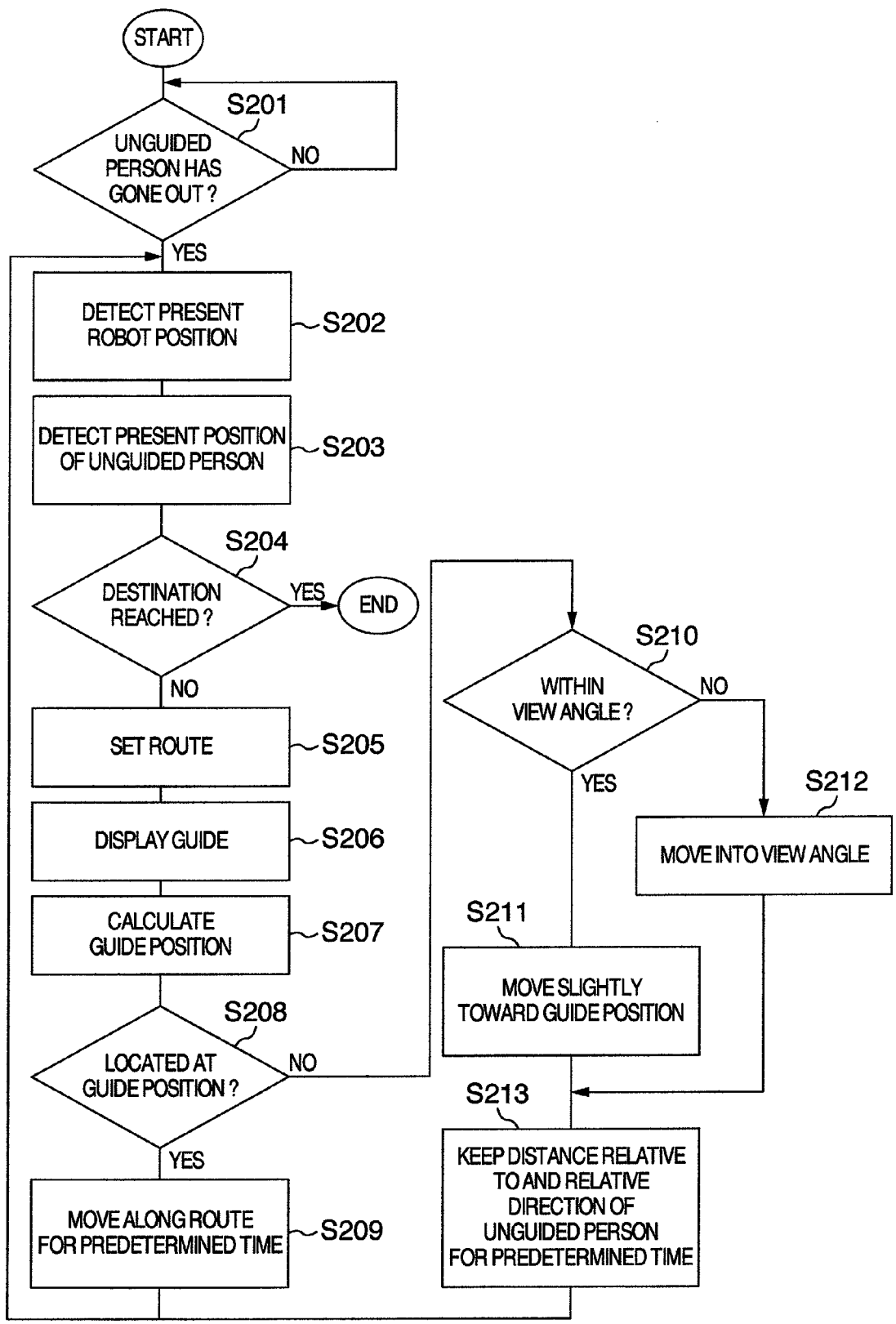
FIG. 8 is a flowchart showing the guide operation according to the still another embodiment.

Next, the flow of the guide operation is explained with reference to the flowchart of FIG. 8 showing the flow of the guide operation.

First, the guide robot device with a preset destination stands by at the entrance of a house. In the case where the unguided person 2 goes out, the guide robot device follows him/her outside (S201) and starts to guide him/her. The present position detection unit 5 detects the present robot position (S202), and the unguided person position detection unit 6 detects the present position of the unguided person 2 (S203) and determines whether the unguided person has reached the destination or not (S204). In the case where the unguided person has reached the destination, the guide operation is ended. In the case where the destination is not yet reached, on the other hand, the route setting unit 7 sets the route up to the destination (S205), and the guide display unit 3 displays the guide in the direction of the destination (S206). Next, the guide position calculation unit 8 calculates the guide position (S207) and determines whether the guide display unit 3 is located at the guide position or not (S208). In the case where the guide display unit 3 is located at the guide position, the guide robot device including the guide display unit 3 is moved for a predetermined toward the destination along the route (S209), while at the same time making adjustment to keep the proper distance with the unguided person 2. After moving for the predetermined time, the process returns to step S202. In the case where the guide display unit 3 is not located at the guide position in step S208, on the other hand, it is determined whether the guide display unit 3 has entered the view angle of the unguided person 2 estimated from the direction of the unguided person detected by the unguided person direction detection unit 31 (S210). The guide display unit 3, if located in the view angle of the unguided person 2, is slightly moved toward the guide position (S211). The guide display unit 3, if located out of the view angle of the unguided person 2 in step S210, on the other hand, is moved into the view angle of the unguided person 2 (S212). Then, the guide display unit 3 is controlled to move while maintaining a predetermined relative distance with and a predetermined relative direction of the unguided person for a predetermined time (S213). After that, the process returns to step S202.

In the way described above, the guide display unit 3 displaying the contents attracting the attention of the unguided person 2 moves toward the destination while at the same time being kept within the field of vision of the unguided person 2. The guide performance is improved, therefore, even for the unguided person 2 low in recognition ability.

As explained above, the unguided person can view the map and the direction of the arrow displayed on the guide display unit 3 coincident with the actual direction of the route, and therefore, can easily grasp the direction in which the destination exists. Also, the present direction in which the guide display unit 3 is viewed coincides with the direction in which to proceed in the future, and therefore, the direction in which to proceed is easily understood.

In view of the fact that the unguided person 2 can proceed with the remote guide of the second guide robot device as a target, the direction in which to proceed is easily understood. Also, even in the case where the final destination is located beyond several corners, the remote guide made by the guide robot device at each corner in relay makes possible an easy-to-understand guide with a small number of guide robot devices.

The unguided person moving in accordance with the guide display unit 3 can be guided to the destination. In the case where the guide robot device moves to the guide position, therefore, the unguided person 2 is prevented from losing sight of the guide robot device.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A guide robot device comprising:
a guide display unit configured to display guide information to an unguided person, in variable directions; and
a moving unit adapted to move with the guide display unit mounted thereon;
a destination position setting unit configured to set a destination position of the unguided person;
an unguided person position detection unit configured to detect a position of the unguided person; and
a guide position calculation unit configured to calculate a guide position as related to the destination position, the detected position of the unguided person and a distance from the guide robot device to the unguided person;
wherein the guide robot device is moved by the moving unit to the calculated guide position, and the direction of the guide information is determined;
wherein the guide position is located on a line segment connecting the detected position of the unguided person and the destination position;
wherein the guide position calculation unit determines whether or not the guide display unit is located in a view angle of the unguided person; and
wherein when the guide position calculation unit determines that the guide display unit is located out of the view angle of the unguided person, the guide display unit is configured to control the moving unit to move the guide robot device into the view angle of the unguided person.

2. The guide robot device according to claim 1,
wherein the guide position calculation unit determines whether or not the guide display unit is located in the view angle of the unguided person based on a direction of the unguided person detected by an unguided person direction detection unit.

3. A guide robot device comprising:
a guide display unit configured to display guide information to an unguided person, in variable directions; and
a moving unit adapted to move with the guide display unit mounted thereon;
a destination position setting unit configured to set a destination position of the unguided person;
an unguided person position detection unit configured to detect a position of the unguided person; and a guide position calculation unit configured to calculate a guide position as related to the destination position, the detected position of the unguided person and a distance from the guide robot device to the unguided person;

wherein the guide robot device is moved by the moving unit to the calculated guide position, and the direction of the guide information is determined;

wherein the guide information is directed from the guide position toward the destination position;

wherein the guide position calculation unit determines whether or not the guide display unit is located in a view angle of the unguided person; and wherein when the guide position calculation unit determines that the guide display unit is located out of the view angle of the unguided person, the guide display unit is configured to control the moving unit to move the guide robot device into the view angle of the unguided person.

4. The guide robot device according to claim 3, wherein the guide position calculation unit determines whether or not the guide display unit is located in the view angle of the unguided person based on a direction of the unguided person detected by an unguided person direction detection unit.

* * * * *